No. 880,326. PATENTED FEB. 25, 1908.
J. F. RAYMOND.
FEED CHOPPER.
APPLICATION FILED JULY 2, 1907.
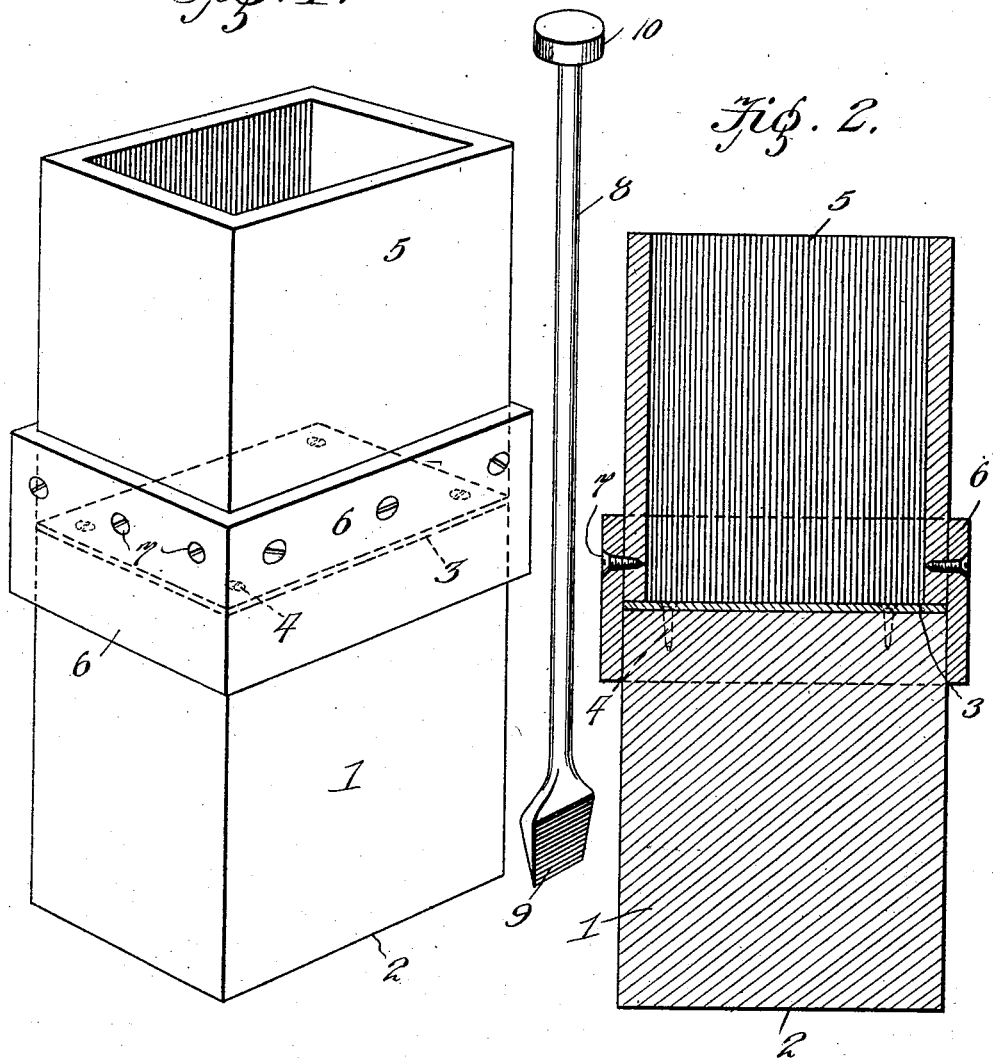
Witnesses
Frank B. Hoffman
C. Bradway.
Inventor
John F. Raymond
By Victor J. Evans
Attorney

UNITED STATES PATENT OFFICE.

JOHN F. RAYMOND, OF SCOTTSBLUFF, NEBRASKA.

FEED-CHOPPER.

No. 880,326.  Specification of Letters Patent.  Patented Feb. 25, 1908.

Application filed July 2, 1907. Serial No. 381,821.

*To all whom it may concern:*

Be it known that I, JOHN F. RAYMOND, a citizen of the United States, residing at Scottsbluff, in the county of Scotts Bluff and State of Nebraska, have invented new and useful Improvements in Feed-Choppers, of which the following is a specification.

This invention relates to devices for preparing food for poultry and the like, and is designed for use in chopping feed or crushing bones, shell and other grit.

The invention has for one of its objects to improve and simplify the construction of devices of this character so as to be comparatively easy and inexpensive to manufacture, and extremely handy and convenient in use.

A further object of the invention is the provision of a feed chopper and crusher comprising a block and a container or holder for the food to be chopped or material to be crushed, the block being reversible and having a wooden face at one end adapted for use in the chopping operation, and with a metal face at the opposite end adapted for use when crushing the material.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a perspective view of the device. Fig. 2 is a vertical section thereof. Fig. 3 is a perspective view of the combined chopping and crushing instrument.

Similar reference characters are employed to designate corresponding parts throughout the several views.

Referring to the drawing, 1 designates a wooden or other block which may be of rectangular or any other cross-section and has at one end a chopping surface 2 and metal plate 3 secured on the opposite end by screws 4 or other fastenings so as to form a suitable surface on which material is crushed.

Adapted to rest on the block to serve as a holder for the material to be chopped or crushed, is a receptacle 5 open at its top and bottom. On the bottom of the receptacle is a collar 6 that is adapted to engage the upper end of the block and thereby hold the receptacle 5 in position. This collar may be formed in any suitable manner and the receptacle fits into the same and is secured thereto by a screw 7. The receptacle or holder 5 is freely removable from the block so that the chopping or crushing surfaces thereof can be interchangeably brought into use.

Any suitable instrument may be employed for the cutting and crushing operation and preferably a combined cutting and crushing implement such as shown in Fig. 3, is preferred. This instrument comprises a rod 8 of suitable length that has a knife 9 formed at one end and a comparatively heavy and flat head 10 at the opposite end that is used for crushing bone, shells, or the like.

In practice, the block 1 is placed upon a suitable foundation and when meat or the like is to be chopped, the block is positioned so that the face 2 will be uppermost. The holder or receptacle 5 is then placed on the block and the material supplied thereto. The operator cuts up the material by means of the knife end of the instrument, which latter is given an up and down chopping motion. The holder prevents the material from dropping off the block during the chopping or crushing operation. After the material is chopped, the cover is removed so as to permit ready access to the material so that it can be collected and distributed to the poultry. When bone, shell or the like is to be crushed, the block is inverted to present the metal face thereof to the material, and after the holder is positioned on the block, the material is supplied and crushed by means of the opposite end of the implement.

Having thus described the invention, what I claim is:—

1. A device of the class described comprising a block having a wooden face at one end and a metal face at the opposite end, and a holder adapted to be applied to either end of and having means to attach it to the block.

2. A device of the class described comprising a wooden block, a metal plate, means for removably securing the plate to the block, a removable receptacle adapted to rest on either end of the block, and a collar on one end of the holder adapted to embrace either end of the block for preventing lateral displacement of the holder.

In testimony whereof, I affix my signature in presence of two witnesses.

JOHN F. RAYMOND.

Witnesses:
SUMNER BURNHAM,
D. HOMER JONES.